June 16, 1942.   G. D. KINGSLAND   2,286,551
TEMPERATURE AND HUMIDITY CONTROL SYSTEM
Filed Jan. 2, 1936   3 Sheets-Sheet 1
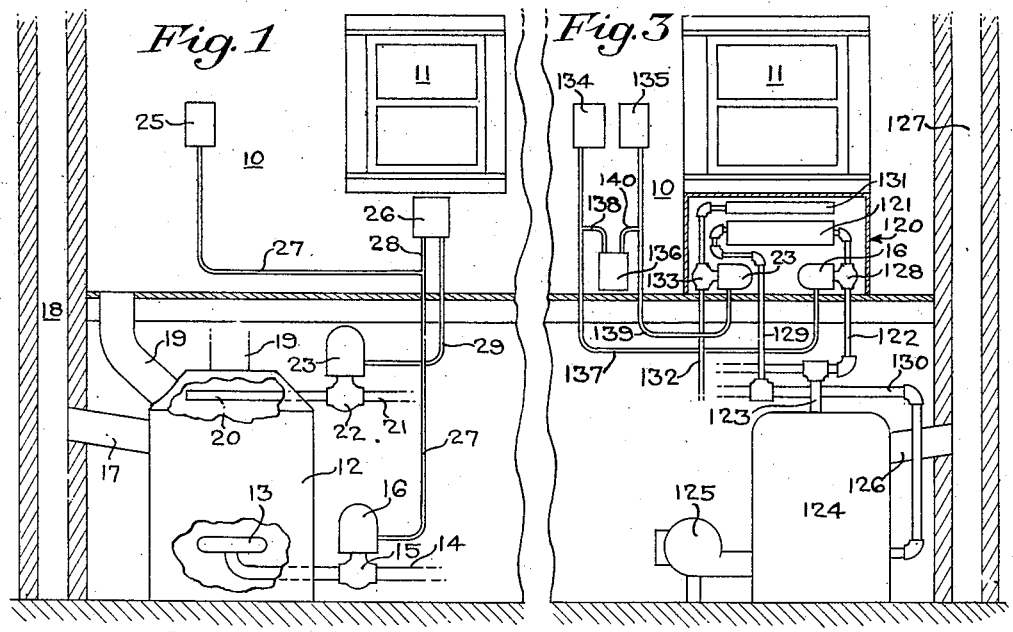
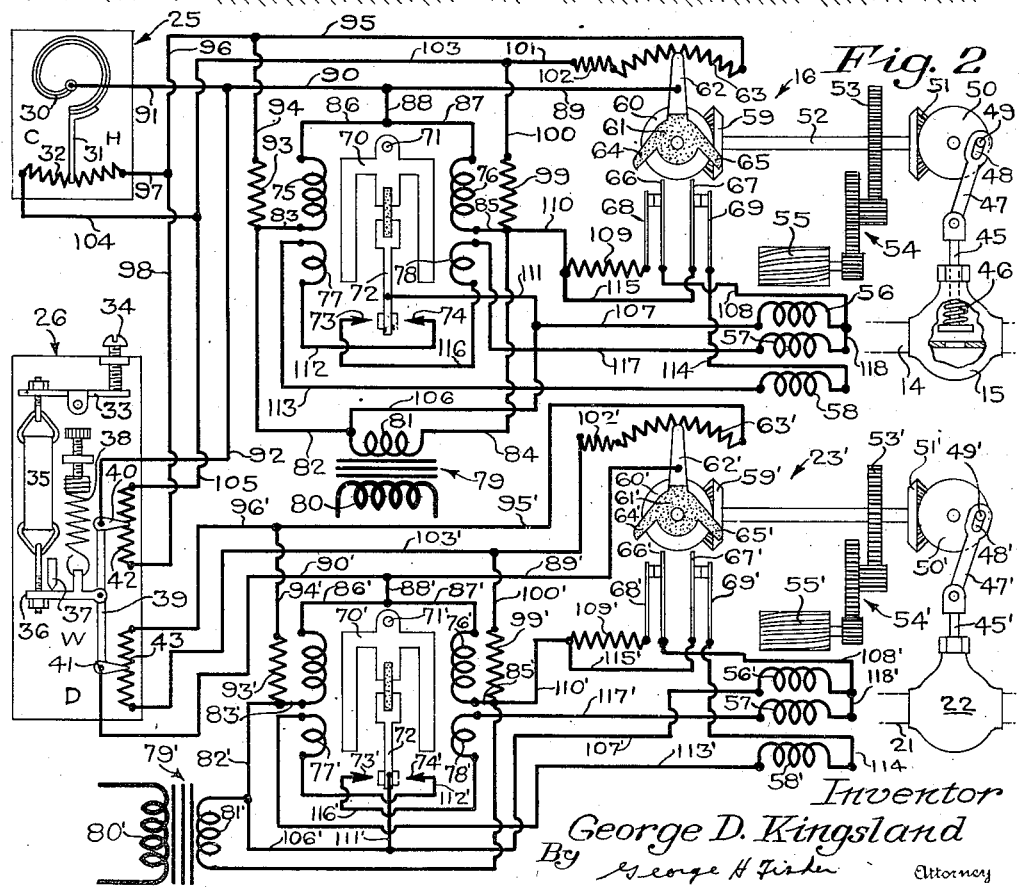
Inventor
George D. Kingsland
By George H Fisher   Attorney June 16, 1942.                G. D. KINGSLAND                2,286,551
                    TEMPERATURE AND HUMIDITY CONTROL SYSTEM
                    Filed Jan. 2, 1936                3 Sheets-Sheet 2
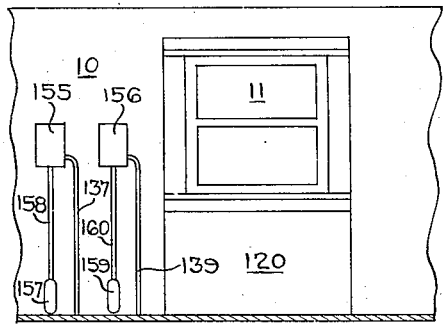
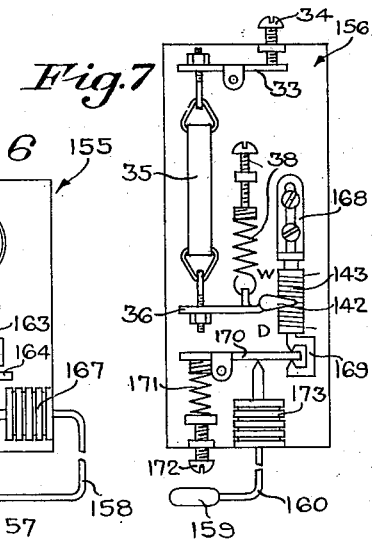
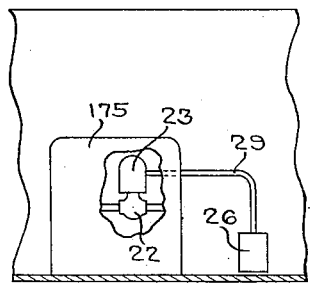
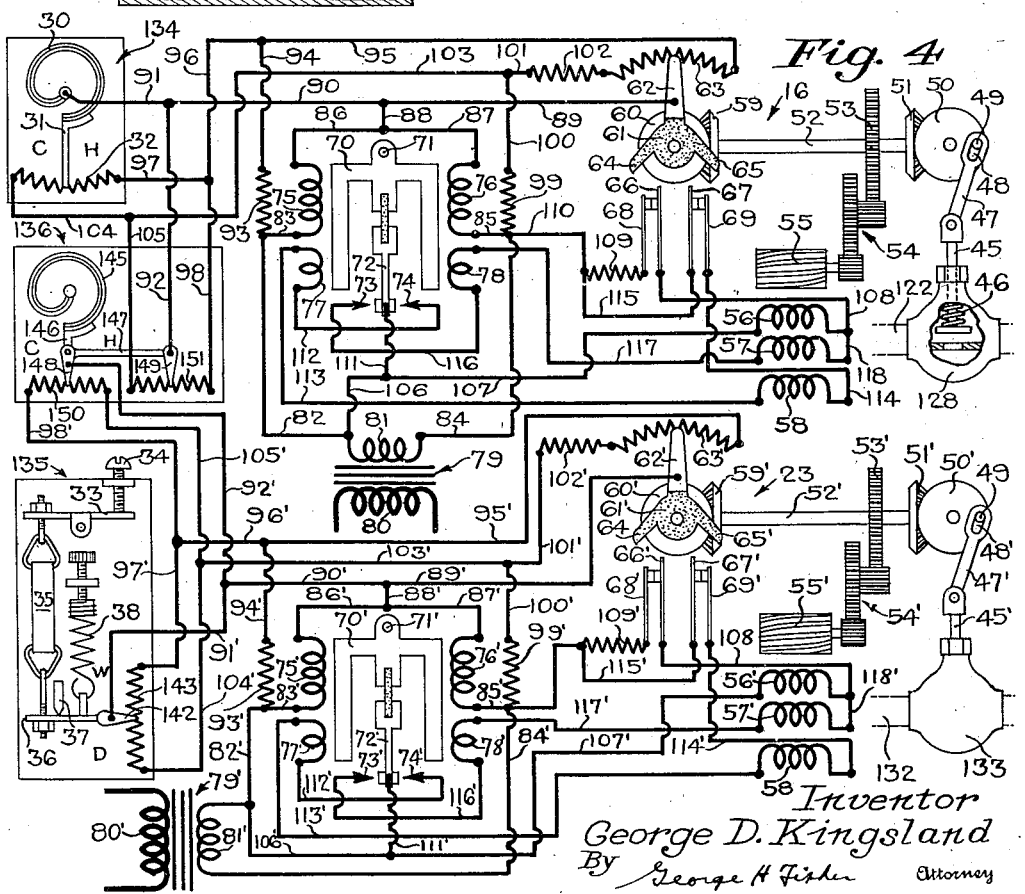
Inventor
George D. Kingsland
By George H Fisher  Attorney June 16, 1942.  G. D. KINGSLAND  2,286,551
TEMPERATURE AND HUMIDITY CONTROL SYSTEM
Filed Jan. 2, 1936  3 Sheets-Sheet 3

Inventor
George D. Kingsland
By
George H Fisher
Attorney

Patented June 16, 1942

2,286,551

UNITED STATES PATENT OFFICE 2,286,551

TEMPERATURE AND HUMIDITY CONTROL SYSTEM

George D. Kingsland, Minneapolis, Minn., assignor to Minneapolis-Honeywell Regulator Company, Minneapolis, Minn., a corporation of Delaware Application January 2, 1936, Serial No. 57,315

2 Claims. (Cl. 236—44)

This invention relates to control systems and particularly to a system for controlling the relative humidity of a space during the winter heating months, and also the temperature thereof.

Many systems have been provided in the past for humidifying spaces or rooms to maintain a predetermined relative humidity therein during the winter to provide comfort and still decrease the load on the heating plant. However, these prior humidifying systems are subject to the objection that upon decreases in outdoor temperature the moisture or water vapor placed in the spaces or rooms by the humidifying means condenses on the relatively cold windows and walls, thereby causing frosting of the windows and injury to the walls.

It is, therefore, the prime object of this invention to provide a humidity control system wherein moisture may be admitted to a room or space but wherein the moisture content of the air within the space or room is decreased when the outdoor temperature decreases, thereby preventing condensation from taking place on the windows and the outside walls of the space.

It is found that changes in outside temperatures are reflected in changes in the room or space temperatures adjacent the windows of the space or room. In other words, a decrease in outside temperature causes a decrease in the space temperature adjacent the windows. It is known that with a given amount of moisture content in the air a decrease in the air temperature consequently causes an increase in the relative humidity. Therefore, since the temperature of the air of the space adjacent the windows is decreased the relative humidity of that air is increased. By placing a humidity responsive device adjacent the window so as to be subject to this increase in relative humidity caused by a decrease in outdoor temperature and having this humidity responsive device control the humidifying means of the space the relative humidity of the space is thereby reduced when the outdoor temperature decreases. This effectively prevents frosting of the windows and condensation of moisture on the outside walls of the space. It is, therefore, an object of this invention to provide a humidity control system wherein the humidity responsive device is located adjacent a window of the space to control the space humidifying means whereby to decrease the introduction of moisture into the space when the outdoor temperature decreases.

It is also found that downward flow of air is present adjacent windows because the reduction in temperature of such air causes its weight per volumeter unit to increase and in order to get an extremely accurate control it is desirable to place the humidity responsive device not only adjacent to the window but below the window so that it will respond more rapidly to changes in outside temperature conditions. As is apparent, the humidity responsive device should not be located underneath a window that has a radiator in front of it. It is, therefore, an object of this invention to provide a humidity control system wherein the humidity responsive device is not only located adjacent the window but below the same whereby to decrease the amount of moisture supplied to the space when the outdoor temperature decreases.

By decreasing the relative humidity in the space in accordance with decreases in outdoor temperatures, the effective temperature of the space is likewise decreased. Therefore, it is another object of this invention to increase the dry bulb temperature of the space as the relative humidity is decreased whereby a substantially constant effective temperature is maintained. This may be accomplished by having the humidity responsive device, which is located adjacent the window or underneath the same, adjust or compensate the room thermostat to increase the dry bulb temperature when the relative humidity of the space is decreased by the increase in relative humidity adjacent the window. The manner in which this mode of operation is accomplished also forms objects of this invention.

It is also found that the relation between the breathing line temperature and the floor line temperature of a space varies in accordance with temperature conditions existing outside of the space. Specifically, upon decreases in outside temperature the floor line temperature also decreases. This principle may also be utilized in this invention by adjusting or compensating a humidity controller responsive to the relative humidity in the space by a thermostatic mechanism responsive to the floor line temperature. Therefore, another object of this invention is to provide a humidity control system wherein the humidity responsive device is adjusted or compensated in accordance with floor line temperatures, whereby the relative humidity of the space or room is decreased as the outdoor temperature decreases to prevent frosting of the windows.

The same mode of operation may be accomplished by locating the thermostat adjacent or underneath the window and this also forms an object of this invention.

It is also an oject of this invention to maintain the effective temperature of the room or space constant when the relative humidity of the room or space is decreased in these last mentioned manners. This may be accomplished by having the same thermostatic means that adjusts the humidity responsive device or another thermostatic means located adjacent the floor line or a thermostatic means located adjacent or underneath the window, adjust or compensate the room thermostat in such a manner as to increase the dry bulb temperature of the space as the relative humidity of the space is decreased in accordance with decreasing floor line temperatures or decreasing temperatures adjacent or underneath the window. The manners in which this effective temperature regulation is obtained also form objects of this invention.

It is also an object of this invention to provide a humidity control system wherein the humidity responsive device itself is located adjacent the floor of the space whereby the relative humidity of the space is decreased as the outdoor temperature decreases. The theory upon which this object is predicated is based on the fact that as the floor line temperature decreases the relative humidity adjacent the floor increases. This humidity responsive device may also adjust or compensate a room thermostat to maintain substantially constant effective temperatures.

Other objects and advantages will become apparent to those skilled in the art upon reference to the accompanying specification, claims and drawings, in which drawings:

Figure 1 is a diagrammatic illustration of one form of my invention as applied to a hot air heating system for a space;

Figure 2 is a wiring diagram of that form of my invention shown in Figure 1;

Figure 3 is a diagrammatic showing of another form of my invention as applied to a unit heater for conditioning a space;

Figure 4 is a wiring diagram of that form of my invention shown in Figure 3;

Figure 5 is a diagrammatic showing of another form of my invention which accomplishes the same results mechanically as are accomplished electrically in Figure 3;

Figure 6 is a view showing the thermostat utilized in Figure 5;

Figure 7 is a view showing the humidity responsive device utilized in Figure 5;

Figure 8 is a diagrammatic illustration of another form of my invention, and

Figure 9:
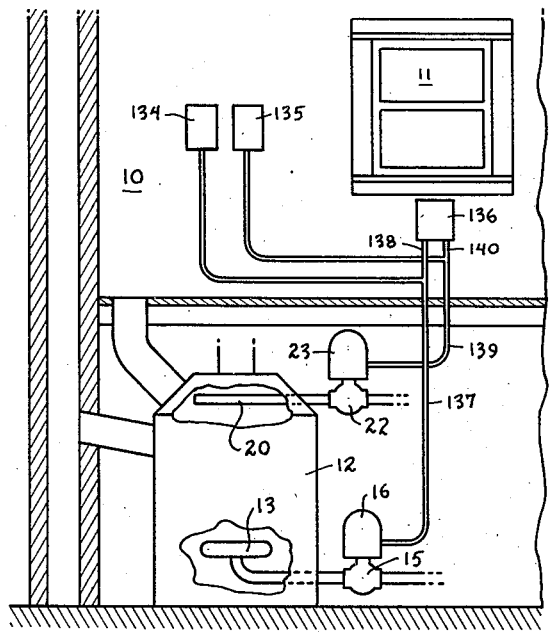
Figures 9 and 10 are diagrammatic illustrations of still other forms of my invention.

Referring now to Figure 1, a room having a window 11 is designated at 10. This room 10 may be heated by a hot air furnace designated at 12 which may in turn be fired by a gas burner 13 receiving a supply of gas from a gas pipe 14 under the control of a valve 15. The valve 15 may be controlled by an electric motor 16 of the type shown and described in Willis H. Gille, Patent No. 2,032,658, Mar. 3, 1936. The gases of combustion may be conveyed from the hot air furnace 12 by a flue 17 to a stack 18. The heated air may be conveyed from the hot air furnace 12 through a duct or conduit 19 to the space 10 to be heated. Located in the bonnet of the hot air furnace 12 is a humidifying device which may take the form of a spray 20 which receives its supply of water from a pipe 21 under the control of a valve 22. The valve 22 may be operated by a motor 23 which is in all respects similar to the motor 16 and which is shown and described in the above referred to Gille patent.

Located in the room 10 is a thermostat 25 and also located in the room 10 adjacent the window and preferably underneath the window 11 is a humidity responsive device 26. The thermostat 25 and the humidity responsive device 26 are connected by suitable conduits 27 and 28 to the motor 16 for controlling the operation of the gas valve 15. The humidity responsive device 26 is suitably connected by a conduit 29 to the motor 23 for controlling the operation of the water valve 22.

The manner in which the thermostat 25 and the humidity responsive device 26 control the gas valve 15 and the water valve 22 is diagrammatically illustrated in Figure 2. The thermostat 25 is shown to comprise a bimetallic element 30 for operating a slider 31 with respect to a potentiometer coil 32, the arrangement being such that upon a decrease in room temperature the slider 31 is moved to the left in the direction indicated by the character C and upon an increase in room temperature, the slider 31 is moved to the right with respect to the potentiometer coil 32 in the direction indicated by the character H.

The humidity responsive device 26 may comprise a pivoted lever 33 which is adjusted by means of an adjusting screw 34. Pivoted lever 33 carries one end of a humidity responsive element 35 and the other end thereof is connected to a lever 36 fulcrumed by a knife-edge 37. The lever 36 is urged in a counter-clockwise direction about its fulcrum 37 by means of an adjustable tension spring 38. The lever 36 is operatively connected to a carrier 39, preferably formed of insulating material, which carries sliders 40 and 41 and is adapted to move these sliders with respect to potentiometer coils 42 and 43, respectively. The arrangement is such that upon an increase in space relative humidity, the humidity responsive element 35 expands to allow movement of the sliders 40 and 41 upwardly with respect to the potentiometer coils 42 and 43 in the direction indicated by the character W and upon a decrease in relative humidity, the humidity responsive element 35 contracts to move the sliders 40 and 41 downwardly with respect to the potentiometer coils 42 and 43 in the direction indicated by the character D. The adjusting screw 34 and the adjustable tension spring 38 provide a means for calibrating and adjusting the setting of the humidity responsive device 26.

The valve 15 for controlling the supply of gas to the hot air furnace 12 is operated by means of a valve stem 45, the valve being biased at all times to a closed position by means of a spring 46 located within the valve 15. The valve stem 45 is connected by a pitman 47, having a slot 48, to a pin 49 mounted on a beveled gear 50 and being located in the slot 48. It is therefore seen that a spring pressed lost motion connection exists between the beveled gear 50 and the valve stem 45. The beveled gear 50 is operated by another beveled gear 51 mounted on a shaft 52 of the motor 16. The shaft 52 carries a gear 53 which is operated through a reduction gear train, generally designated at 54, by a motor rotor 55. The motor rotor 55 is operated by field windings 56, 57 and 58. The field winding 56 is of sufficient strength to maintain the valve in any number of given positions against the action of the valve biasing spring 46 but field winding 56 is not of sufficient strength to overcome the valve biasing spring 46 to move the valve towards an open position. Field winding 57 is opposite in action to the field winding 56 and when both of field windings 56 and 57 are energized, the holding effect of field winding 56 on the rotor 55 is neutralized and the valve biasing spring 46 causes closing movement of the valve 15. The field winding 58 acts in the same direction as the field winding 56 and when the field windings 56 and 58 are simultaneously energized, the action of the valve biasing spring 46 is overcome and the valve 15 is moved towards an open position.

The shaft 52 also carries another beveled gear 59 which meshes with a beveled gear 60 which in turn carries an abutment member 61, preferably formed of insulating material. The abutment member 61 operates a slider 62 with respect to a balancing potentiometer coil 63, the arrangement being such that upon opening movement of the valve 15, the slider 62 is moved to the right with respect to the potentiometer coil 63 and upon closing movement of the valve 15, the slider 62 is moved to the left with respect to the balancing potentiometer coil 63. The abutment member 61 carries fingers 64 and 65 which are adapted to engage contacts 66 and 67 to move these contacts 66 and 67 out of engagement with contacts 68 and 69, respectively upon extreme closing or opening movement of the valve 15. As will be pointed out more fully hereafter, the contacts 66, 67, 68 and 69 form limit switches for the motor 16.

The motor 16 also contains a relay mechanism which may comprise an armature 70 pivotally mounted at 71. A switch arm 72 is carried by the armature 70, insulated therefrom, and operated thereby with respect to contacts 73 and 74. The armature 70 is moved about its pivot 71 by means of relay coils 75, 76, 77 and 78. When the relay coil 75 is energized more than the relay coil 76, the switch arm 72 is moved into engagement with the contact 74 and when the relay coil 76 is energized more than the relay coil 75, the switch arm 72 is moved into engagement with the contact 73.

Power is supplied to the motor 16 by means of a step-down transformer 79 having a primary 80 connected to some source of power, not shown, and a secondary 81. One end of the secondary 81 is connected by wires 82 and 83 to one end of relay coil 75 and the other end of the secondary 81 is connected by wires 84 and 85 to one end of the relay coil 76. The other ends of the relay coils 75 and 76 are connected together by means of wires 86 and 87. The junction of wires 86 and 87 is connected by wires 88, 89, 90, 91 and 92 to the slider 62 of the balancing potentiometer, to the slider 31 of the room thermostat 25 and to the slider 40 of the humidity responsive device 26. The junction of wires 82 and 83 is connected by a protective resistance 93 and wires 94 and 95 to the right hand end of balancing potentiometer coil 63. The junction of wires 94 and 95 is connected by wires 96 and 97 to the right-hand end of potentiometer coil 32 of the room thermostat 25 and the junction of wires 96 and 97 is connected by a wire 98 to the lower end of the potentiometer coil 42 of the humidity responsive device 26. The junction of wires 84 and 85 is connected by a protective resistance 99, wires 100 and 101 and resistance 102 to the left-hand end of balancing potentiometer coil 63. The junction of wires 100 and 101 is connected by wires 103 and 104 to the left-hand end of potentiometer coil 32 of the room thermostat 25 and the junction of wires 103 and 104 is connected by a wire 105 to the upper end of potentiometer coil 42 of the humidity responsive device 26. Thus, it is seen that the upper ends of the relay coils 75 and 76 and the sliders 62, 31 and 40 are connected together, that the lower end of the relay coil 75, the right-hand end of balancing potentiometer coil 63, the right-hand end of potentiometer coil 32 and the lower end of the potentiometer coil 42 are connected together, that the lower end of the relay coil 76, the left-hand end of balancing potentiometer coil 63, the left-hand end of potentiometer coil 32, and the upper end of potentiometer coil 42 are connected together, and that the lower ends of the relay coils 75 and 76 are connected across the secondary 81 of the step-down transformer 79. It is therefore seen that the secondary 81 of the step-down transformer 79, the relay coils 75 and 76, the balancing potentiometer, the room thermostat potentiometer and the humidity responsive device potentiometer are all connected in parallel.

The left-hand end of secondary 81 is connected by means of wires 106 and 107 to one end of field winding 56 and the other end of field winding 56 is connected by a wire 108 to the limit switch contact 66. The limit switch contact 66 cooperating with the contact 68 is connected by a resistance 109 and a wire 110 to the junction of wires 84 and 85. The junction of wires 106 and 107 is connected by a wire 111 to the switch arm 72 operated by the relay armature 70. The contact 74, cooperating with the switch arm 72, is connected by a wire 112 to one end of relay coil 77 and the other end thereof is connected by a wire 113 to one end of field winding 58. The other end of field winding 58 is connected by a wire 114 to the limit switch contact 69. The limit switch contact 67, cooperating with the contact 69, is connected by a wire 115 to the junction of resistance 109 and the wire 110. The contact 73, cooperating with the switch arm 72, is connected by a wire 116 to one end of the relay coil 78 and the other end thereof is connected by a wire 117 to one end of field winding 57. The other end of field winding 57 is connected by a wire 118 to the junction of field winding 56 and the wire 108.

The operation of the structure just described is as follows: The sliders 31, 40 and 62 are in a mid-position with respect to their potentiometer coils 32, 42 and 63, respectively and, as a result thereof, the switch arm 72 is in a mid-position with respect to the contacts 73 and 74 and the valve 15 is in half open position. With the parts in this position, a circuit is completed from the secondary 81 through wires 106 and 107, field winding 56, wire 108, limit switch contacts 66 and 68, resistance 109, wires 110 and 84 back to the secondary 81. This circuit causes energization of field winding 56 to maintain the valve 15 in its half open position. Assume for the present that the slider 40 is maintained in the mid-position with respect to its potentiometer coil 42. Movement of slider 31 to the left with respect to the potentiometer coil 32 in the direction indicated by the character C, upon a decrease in space temperature, causes partial short-circuiting of the relay coil 76 and by reason of the parallel relationship set out above, this causes the energization of the relay coil 76 to decrease and the energization of relay coil 75 to increase. Due to this unbalanced relationship of the relay coils 75 and 76, the switch arm 72 is moved into engagement with the contact 74 to complete a circuit from the secondary 81 through wires 106 and 111, switch arm 72, contact 74, wire 112, relay coil 77, wire 113, field winding 58, wire 114, limit switch contacts 69 and 67 and wires 115, 110 and 84 back to the secondary 81. Completion of this circuit causes energization of the field winding 58 and since the field winding 56 is energized in the manner pointed out above, the valve 15 is moved towards an open position against the bias of the spring 46 to supply more gas to the burner 13 to supply more heat to the space 10.

Movement of the valve 15 towards an open position in this manner causes right-hand movement of slider 62 with respect to the potentiometer coil 63. Movement of slider 62 to the right with respect to the balancing potentiometer coil 63 causes partial short-circuiting of the relay coil 75 and due to the parallel relationship pointed out above, this partial short-circuit of relay coil 75 decreases the energization thereof and increases the energization of relay coil 76, it being remembered that the relay coil 75 was energized more than the relay coil 76 by the left-hand movement of slider 31 with respect to its potentiometer coil 32. When the slider 62 has been moved sufficiently far to the right with respect to balancing potentiometer coil 63, to rebalance the energizations of the relay coils 75 and 76, the switch arm 72 is moved out of engagement with the contact 74 to the mid-position as shown in the drawing. This causes breaking of the circuit through the field winding 58 to prevent further opening movement of the valve 15 and since the field winding 56 is maintained energized in the manner pointed out above, the valve 15 will be maintained in the new position.

Upon an increase in space temperature, the slider 31 is moved to the right with respect to potentiometer coil 32 in the direction indicated by the character H and this right-hand movement causes partial short-circuiting of the relay coil 75 to decrease the energization thereof and increase the energization of the relay coil 76. This unbalanced relationship between the relay coils 75 and 76 causes movement of the switch arm 72 into engagement with the contact 73 to complete a circuit from the secondary 81, through wires 106 and 111, switch arm 72, contact 73, wire 116, relay coil 78, wire 117, field winding 57, wires 118 and 108, limit switch contacts 66 and 68, resistance 109 and wires 110 and 84 back to the secondary 81. This causes energization of the field winding 57 which neutralizes the action of field winding 56 to allow the spring 46 to move the valve 15 towards a closed position. Movement of the valve 15 towards a closed position decreases the amount of gas supplied to the burner 13 and consequently decreases the amount of heat delivered to the space 10.

Movement of valve 15 towards a closed position causes left-hand movement of slider 62 with respect to the balancing potentiometer coil 63 which movement causes partial short-circuiting of the relay coil 76 to decrease the energization thereof and increase the energization of the relay coil 75, it being remembered that the energization of relay coil 75 was decreased and the energization of the relay coil 76 was increased by reason of the right-hand movement of slider 31 with respect to its potentiometer coil 32. When the slider 62 has moved sufficiently far to the left with respect to balancing potentiometer coil 63 so as to rebalance the energization of the coils 75 and 76, the switch arm 72 is moved out of engagement with the contact 73 to the mid-position shown in the drawing to cause deenergization of the field winding 57. Deenergization of field winding 57 prevents further closing movement of the valve 15 by the spring 46 and when the field winding 56 is maintained energized in the manner pointed out above, the valve 15 is maintained in its newly adjusted position.

By reason of the above construction, the valve 15 is modulated or proportioned between closed and opened positions in accordance with changes in space temperature whereby substantially constant space temperatures are maintained within the space 10.

Movement of the valve 15 to a full open position causes the finger 65 to engage the contact 67 to separate the limit switch contacts 67 and 69 to break the circuit through the field winding 58, whereby the coil 58 is deenergized when the valve has reached its full open position. Likewise, when the valve 15 is moved to a full closed position, the finger 64 breaks contact between the limit switch contacts 66 and 68 to cause deenergization of field windings 56 and 57. Complete closing movement of the valve 15 is insured by reason of the resistance 102 which is not engaged by the slider 62 of the balancing potentiometer. Therefore, the balancing potentiometer cannot entirely rebalance the energizations of the relay coils 75 and 76 before the valve 15 is completely closed. The specific manner in which this is carried out is pointed out in the above referred to Gille patent.

Since the circuit through the field winding 56 is broken when the valve 15 is moved to a complete closed position, it is necessary to provide the above-referred to lost motion connection between the motor 16 and the valve stem 45. Upon a call for heat by the room thermostat 25 to cause energization of the field winding 58, the motor 16 is placed in operation to take up the lost motion provided by the slot 48, this movement of the motor being permitted by reason of the fact that during this preliminary movement of the motor field winding 58 does not have to act against the valve biasing spring 46. When the lost motion is taken up in this manner, the finger 64 is moved out of engagement with the limit switch contact 66 to cause energization of the field winding 56 whereby the combined action of field windings 56 and 58 may overcome the spring 46 and move the valve to an open position as demanded by the room thermostat 25.

The resistance 109 is placed in the circuits through the field windings 56 and 57 to compensate for the decrease in resistance caused by the opposed or bucking action of the coils 56 and 57, all of which is clearly pointed out in the above referred to Gille application. It will also be noted that the circuits through the field windings 57 and 58 pass through the relay coils 78 and 77 respectively, whereby the switch arm 72 is held in engagement with the contacts 73 and 74 with a substantial force to prevent relay chatter from occurring at these points.

The motor 23 for operating the water valve 22 is exactly the same as the motor 16 for operating the gas valve 15 and the mode of operation thereof is also exactly the same. The various parts of the motor 23 corresponding to the parts of the motor 16 are indicated by like primed reference characters and therefore a complete description of the structure and mode of operation of the motor 23 is not considered necessary. The upper ends of the relay coils 75' and 76' are connected by wires 86', 87', 88' and 90' to the slider 41 of the humidity responsive device 26. The lower end of the relay coil 75' is connected by wires 83', protective resistance 93' and wires 94' and 96' to the upper end of the potentiometer coil 43 of the humidity responsive device 26. In a like manner, the lower end of the relay coil 76' is connected by a wire 85', a protective resistance 99' and wires 100' and 103' to the lower end of the potentiometer coil 43 of the humidity responsive device 26. It therefore follows that upon a decrease in relative humidity within the space 10 so as to move the slider 41 downwardly with respect to the potentiometer coil 43, as indicated by the character D, the valve 22 is moved towards an open position to supply more moisture to the air within the space 10, the amount of opening movement of the valve being dependent upon the decrease in the relative humidity. Likewise, upon an increase of relative humidity within the space 10, the slider 41 is moved upwardly with respect to the potentiometer coil 43 in the direction indicated by the character W to move the water valve 22 towards a closed position, the amount of closing movement being dependent upon the amount of increase in space relative humidity. In this manner, the supply of water vapor to the space 10 is decreased. By reason of this construction, the percent of relative humidity within the space 10 is maintained at a substantially constant value so long as the outdoor temperature remains constant.

As pointed out above, decreases in outdoor temperature cause decreases in space temperature adjacent the window 11 and a decrease in space temperature at this point will cause an increase in the relative humidity at this point. By locating the humidity responsive device 26 adjacent the window so as to respond to this increase in the percent of relative humidity, caused by decrease in outdoor temperature, the valve 22 will be moved towards a closed position to decrease the amount of moisture being delivered to the space 10 whereby frosting of the windows and condensation of moisture on the walls is effectively prevented. Therefore, by reason of this location of the humidity responsive device, the relative humidity of the space 10 may be kept at a desired value but this relative humidity is decreased upon a decrease in outdoor temperature to prevent frosting of the windows and condensation of moisture on the walls. Although the humidity responsive device responds to these changes readily when it is located adjacent the window, the response is more direct and more accurate when the humidity responsive device is located beneath the window and consequently it is desirable to place the humidity responsive device 26 below the window when there is no radiator in front of the window.

Upon an increase in relative humidity adjacent the window as caused by decreases in outdoor temperature, which affects the humidity responsive device 26 to decrease the percent of relative humidity within the space 10, the effective temperature of the space 10 is also decreased. In order to maintain the effective temperature of the space 10 at a substantially constant value, it is necessary to increase the dry bulb temperature in accordance with the decreases in the percent of relative humidity. Therefore, the potentiometer coil 42 and the slider 40 of the humidity responsive device 26 are connected in parallel with the potentiometer coil 32 and slider 31 of the thermostat 25. With the slider 31 of the thermostat 25 in the mid-position shown in the drawing, an increase in relative humidity adjacent or beneath the window 11 causes upward movement of the slider 40 with respect to the potentiometer coil 42. This upward movement causes partial short-circuiting of the relay coil 76 to decrease the energization thereof and increase the energization of relay coil 75 thereby causing opening movement of the valve 15, the amount of opening movement being dependent upon the increase in relative humidity of the space adjacent or beneath the window 11. In this manner, the amount of heat supplied to the space 10 is increased in accordance with the decrease in relative humidity existing within the space 10. Since both the humidity responsive device 26 and the thermostat 25 control the operation of the gas valve 15, a substantially constant effective temperature is maintained within the space 10 at all times and the relative humidity within the space 10 is maintained at such a value whereby frosting of the windows and condensation of moisture on the walls are effectively prevented.

Referring now to Figure 3 of the drawings, I have shown a modified form of control system as applied to a unit heater generally designated at 120. The unit heater 120 may comprise a radiator 121, receiving a supply of heating fluid such as steam through a riser 122 and a header 123 from a boiler 124. The boiler 124 may be fired in any suitable manner as by means of an oil burner 125. The gases of combustion may pass from the boiler 124 through a flue 126 into a chimney 127. The supply of heating fluid to the radiator 121 may be controlled by means of a valve 128 which in turn is positioned between an opened and closed position by means of the motor 16 which is in all respects the same as the motor 16 for operating the gas valve 15 of Figure 1. The expended heating fluid may be returned from the radiator 121 through a riser 129 and a header 130 to the boiler 124. Also located within the unit heater 120 is a humidifying means which may take the form of a spray 131 which receives its supply of water through a pipe 132 under the control of a water valve 133. The water valve 133 is operated by means of a motor 23 which is identical to the motor 23 of Figures 1 and 2.

Located within the space 10 is a thermostat 134 which is in all respects the same as the thermostat 25 of Figures 1 and 2. Also located within the space 10 is a humidity responsive device 135 which is similar to the humidity responsive device 26 of Figures 1 and 2. This form of the invention contemplates the use of a thermostat 136 also located within the space 10 for adjusting or compensating the control by the thermostat 134 and the humidity responsive device 135. The thermostat 134 and the thermostat 136 are connected by suitable conduits 137 and 138 to the motor 16 for controlling the supply of heating fluid to the radiator 121. The humidity responsive device 135 and the thermostat 136 are connected by suitable conduits 139 and 140 to the motor 23 for controlling the supply of moisture to the space 10. As shown in Figure 3, the compensating or adjusting thermostat 136 is located adjacent the floor of the space 10.

The manner in which the motors 16 and 23 of this form of the invention are controlled in accordance with varying conditions within the space 10 is clearly shown in Figure 4. The space thermostat 134 is identical with the space thermostat 25 of Figure 1 and comprises a bimetallic element 30 for operating a slider 31 with respect to a potentiometer coil 32, the arrangement being such that upon an increase in space temperature, the slider 31 is moved to the right and upon a decrease in space temperature, slider 31 is moved to the left.

The humidity responsive device 135 is in some manners similar to the humidity responsive device 26 of Figures 1 and 2 and is shown to comprise a lever 33 adjusted by an adjusting screw 34 to which one end of a humidity responsive element 35 is connected. The other end of the humidity responsive element 35 is connected to a lever 36 fulcrumed at 37, the lever being urged in a counter-clockwise direction by an adjustable tension spring 38. Instead of operating a plurality of sliders as in Figures 1 and 2, the lever 36 operates a single slider 142 with respect to a potentiometer coil 143, the arrangement being such that upon increases in relative humidity, the slider 142 is moved upwardly in the direction indicated by the character W and upon decreases in relative humidity, the slider 142 is moved downwardly in the direction indicated by the character D.

The compensating or adjusting thermostat 136 may comprise a bimetallic element 145 for operating an arm 146. The arm 146 is operatively connected to a carrier 147 preferably formed by insulating material which carries sliders 148 and 149. The sliders 148 and 149 are moved with respect to potentiometer coils 150 and 151, respectively, upon changes in floor line temperature affecting the bimetallic element 145. The arrangement is such that upon an increase in floor line temperature, the sliders 148 and 149 are moved to the right with respect to the potentiometer coils 150 and 151 in the direction indicated by the character H and upon a decrease in floor line temperature, the sliders 148 and 149 are moved to the left in the direction indicated by the character C.

The potentiometer coil 32 and slider 31 of the thermostat 134 are connected to the relay coils 75 and 76 in exactly the same manner as in Figure 2 and therefore it follows that upon an increase in space temperature, the valve 15 is moved towards closed position to decrease the supply of heat to the space 10 and upon a decrease in space temperature, the valve 15 is moved towards open position to increase the supply of heat to the space 10. In each instance, the amount of opening or closing movement of the valve 15 is determined by the increase or decrease of the space temperature. The slider 142 and the potentiometer coil 143 of the humidity responsive device 135 are connected to the relay coils 75' and 76' in exactly the same manner as the potentiometer coil 43 and the slider 41 are connected to the relay coil 75' and 76' of Figure 2. Therefore, it follows that upon an increase in space relative humidity, the valve 133 is moved towards a closed position and upon a decrease in space relative humidity, the valve 133 is moved towards an open position, the amount of opening and closing movement of the valve 133 being dependent upon the deviation of the space relative humidity from the desired value.

The left-hand end of potentiometer coil 150 of compensating or adjusting thermostat 136 is connected by wires 98' and 97' to the upper end of the potentiometer coil 143 of the humidity responsive device 135. In a like manner, the right-hand end of potentiometer coil 150 is connected by wires 105' and 104' to the lower end of the potentiometer coil 143 and the slider 148 associated with the potentiometer coil 150 is connected by wires 92' and 91' to the slider 142 associated with the potentiometer coil 143. It is therefore seen that the potentiometer coil 150 and slider 148 of the compensating or adjusting thermostat 136 are connected in parallel with the potentiometer coil 143 and the slider 142 of the humidity responsive device 135.

As pointed out above, it is found that upon a decrease in outside temperature, the floor line temperature is also decreased. Also, as pointed out above, sufficient decrease in outside temperature ordinarily causes frosting of the windows and condensation of moisture on the walls. By placing the compensating or adjusting thermostat 136 adjacent the floor line so as to respond to these decreases in floor line temperature as caused by decreases in outdoor temperature and by having the compensating or adjusting thermostat 136 adjust or compensate the control of the water valve 133 by the humidity responsive device 35, a control is obtained whereby frosting of the windows and condensation of moisture on the walls is effectively prevented. Assume that the slider 142 is in such a position with respect to the potentiometer coil 143 so as to supply the correct amount of moisture to the space 10 and that the outside temperature thereupon decreases, this decrease in outside temperature causes a decrease in floor line temperature and the bimetallic element 145 responding to this decrease in floor line temperature causes movement of the slider 148 to the left with respect to the potentiometer coil 150. This left-hand movement causes partial short-circuiting of the relay coil 75' to decrease the energization thereof and increase the energization of the relay coil 76'. This causes movement of water valve 133 towards a closed position to decrease the supply of moisture to the space 10 whereby the relative humidity of the space 10 is decreased and frosting of the windows and condensation of moisture on the walls is prevented. If the outdoor temperature should thereafter rise, the floor line temperature of the space 10 would likewise rise and the bimetallic element 145 responding to this increase in floor line temperature causes movement of slider 148 to the right with respect to the potentiometer coil 150. This movement causes partial short-circuiting of the relay coil 76' to decrease the energization thereof and increase the energization of relay coil 75' to move the water valve 133 towards an open position. In this manner, the percent of relative humidity within the space 10 is increased upon increases in outdoor temperature. By reason of this construction shown in Figures 3 and 4, the space relative humidity is maintained at a desired value but upon a decrease in outdoor temperature which would normally cause frosting of the windows and condensation of moisture on the walls, the percent of relative humidity within the space 10 is decreased to absolutely prevent this undesirable function.

A decrease in relative humidity of the space 10 brought about in the above manner causes a decrease in the effective temperature within the space 10. In order to maintain the effective temperature of the space 10 constant, the dry bulb temperature thereof must be increased and the amount of increase in dry bulb temperature must bear some relationship to the amount of decrease in relative humidity. Therefore, the potentiometer coil 151 and the slider 149 of the adjusting or compensating thermostat 136 is connected in parallel with the space thermostat 134, the left and right-hand ends of the potentiometer coils 151 and 32 being connected together and the sliders 149 and 31 associated with the potentiometer coils 151 and 132, respectively, also being connected together.

Assume that the slider 31 is so positioned with respect to the potentiometer coil 32 to maintain the valve 128 in the correct position to maintain the space temperature at the desired value. Upon a decrease in outdoor temperature which through the above described control system decreases the relative humidity within the space 10, the slider 149 is moved to the left with respect to the potentiometer coil 151. This left-hand movement causes partial short-circuiting of the relay coil 76 to decrease the energization thereof and increase the energization of the relay coil 75. This causes movement of the valve 128 towards an open position to supply additional heat to the space 10 whereby the dry bulb temperature of the space 10 is increased. Upon an increase in outdoor temperature, the floor line temperature of the space 10 is increased to cause movement of the slider 149 to the right with respect to potentiometer coil 151 which causes partial short-circuiting of the relay coil 75 to decrease the energization thereof and increase the energization of relay coil 76. This unbalanced relationship of coils 75 and 76 causes closing movement of the valve 128 to decrease the supply of heat to the space 10. Since both the space thermostat 134 and the humidity responsive device 135 are adjusted or compensated in accordance with changes in floor line temperature, the relative humidity within the space 10 is decreased and the dry bulb temperature of the space 10 is increased upon a decrease in outdoor temperature whereby a substantially constant effective temperature is maintained within the space 10 and frosting of the windows and condensation of moisture on the walls is prevented.

In Figures 3 and 4, I have shown the space thermostat 134 and the space humidity responsive device 135 to be electrically adjusted or compensated by the floor line thermostat 136. However, the same mode of operation and the same results may be obtained by mechanically adjusting the space thermostat 134 and the space humidity responsive device 135. Such construction is diagrammatically illustrated in Figure 5 wherein the space thermostat is designated at 155 and the space humidity responsive device is designated at 156, these devices being connected by suitable conduits 137 and 139 to the motors 16 and 23 for controlling the supply of steam and the supply of humidifying water to the unit heater 120 as in Figure 3. The space thermostat 155 is shown to be adjusted by a bulb 157 connected thereto by the capillary tube 158 and the humidity responsive device 156 is shown to be adjusted or compensated by a bulb 159 connected thereto by a capillary tube 160. The bulbs 157 and 159 are located adjacent the floor to respond to floor line temperatures as effected by outdoor temperatures. The manner in which the space thermostat 155 and the humidity responsive device 156 control the heating fluid valve 128 and the water valve 133 is exactly the same as that shown in Figure 4.

Referring now to Figure 6, the space thermostat 155 is shown to comprise a bimetallic element 161 for operating a slider 162 with respect to a potentiometer coil 163. The potentiometer coil 163 is mounted on a slidable bracket 164 which is urged to the right by a compression spring 165 suitably adjusted by an adjusting screw 166. The bracket 164 is urged to the left by a bellows 167 which is connected by the capillary tube 158 to the floor line bulb 157. Upon a decrease in floor line temperature, the bellows 167 contracts and spring 165 moves the potentiometer coil 163 to the right with respect to the slider 162 and upon an increase in floor line temperature, the bellows 167 expands and the potentiometer coil 163 is moved to the left with respect to the slider 162. The bimetallic element 161 is so arranged that it moves the slider 162 to the left upon decreases in space temperature and to the right upon increases in space temperature as indicated by the characters C and H respectively. The potentiometer coil 163 and the slider 162 are connected to the relay coils 75 and 76 in exactly the same manner as the potentiometer coil 32 and slider 31 are connected in Figure 4. A decrease in floor line temperature causes movement of the coil 163 to the right with respect to the slider 162 and has the same effect as movement of the slider 162 to the left with respect to the coil 163 under the action of bimetallic element 161 both of which cause opening movement of the valve 128 to increase the supply of heat to the space 10. Likewise, an increase in floor line temperature which causes left-hand movement of coil 163 with respect to the slider 162 has the same effect as movement of slider 162 to the right with respect to the potentiometer coil 163, caused by an increase in space temperature, both of which cause movement of the valve 128 towards a closed position. In this manner, the thermostat 155 is adjusted or compensated mechanically in accordance with floor line temperatures to increase the supply of heat to the space 10 as the floor line temperature decreases and to decrease the amount of heat to the space 10 as the floor line temperature increases.

In Figure 7, I have shown the humidity responsive device 156 to be substantially the same as the humidity responsive device 135 of Figures 3 and 4, provision being made in Figure 7 however for longitudinal movement of the potentiometer coil 143. The potentiometer coil 143 is shown to be mounted on a bracket 168 and to carry a yoke 169 which is engaged by a pivoted lever 170. The lever 170 is urged in a clockwise direction about its pivot by means of a compression spring 171 which may be adjusted by an adjusting screw 172. The lever 170 may be urged in a counter-clockwise direction by a bellows 173 which is connected by the capillary tube 160 to the floor line bulb 159, the arrangement being such that when the floor line temperature increases, the potentiometer coil 143 is moved upwardly and when the floor line temperature decreases, the potentiometer coil 143 is moved downwardly. The potentiometer coil 143 and the slider 142 of Figure 7 are connected to the relay coils 75' and 76' in exactly the same manner as in Figure 4. Movement of the potentiometer coil 143 downwardly with respect to the slider 142 upon a decrease in floor line temperature has the same effect as upward movement of the slider 142 with respect to the potentiometer coil 143 both of which cause partial short-circuiting of the relay coil 75' to decrease the energization thereof and increase the energization of relay coil 76'. This causes movement of valve 133 towards a closed position. Upon an increase in floor line temperature, the potentiometer coil 143 is moved upwardly with respect to the slider 142 which has the same effect as moving the slider 142 downwardly with respect to the potentiometer coil 143 both of which cause partial short-circuiting of the relay coil 76' to decrease the energization thereof and increase the energization of relay coil 75'. This causes opening movement of the water valve 133 to increase the amount of moisture delivered to the space 10. In this manner, a decrease in floor line temperature as caused by a decrease in outdoor temperature causes closing movement of the water valve 133 to decrease the supply of moisture to the space 10 and an increase in the floor line temperature as caused by an increase in outdoor temperature causes opening movement of the water valve 133 to increase the supply of moisture to the space 10. Therefore, by reason of this construction, the humidity responsive device 156 is mechanically adjusted to decrease the relative humidity within the space 10 as the outdoor temperature decreases whereby frosting of the windows and condensation of moisture on the walls is effectively prevented.

Since the temperature adjacent the windows or underneath the windows decreases as the outdoor temperature decreases, the adjusting or compensating thermostat 136 of Figure 3 or the adjusting or compensating bulbs 157 and 159 of Figure 5 may equally as well be placed adjacent or underneath the windows to effect the same control as is accomplished in Figures 3 and 5 wherein the thermostat 136 and the bulbs 157 and 159 are located adjacent the floor and it is within the contemplation of this invention to so locate these devices. The control afforded by such a location of these devices would compare favorably with the control obtained by the location of the devices as illustrated in Figures 3 and 5. Accordingly, in Figure 9 the compensating thermostat 136 which compensates or adjusts the thermostat 134 and the humidity responsive controller 135 is shown to be located under the window 11. The conduit connections between the controllers 134, 135 and 136 and the valve motors 16 and 23 of Figure 9 are designated by the same reference characters as in Figure 3. The wiring arrangement of Figure 4 is utilized in Figure 9.

Since the floor line temperature decreases in accordance with outdoor temperature and since the relative humidity increases upon decreases in temperature, the relative humidity adjacent the floor of the space 10 will increase upon decreases in outdoor temperature. It is therefore possible to obtain a satisfactory operation of a humidifying means by locating the humidity responsive device adjacent the floor to respond to increases in relative humidity of the space adjacent the floor as caused by increases in outdoor temperature. Consequently, in Figure 8, I have disclosed a humidity responsive device 26 located adjacent the floor for controlling the operation of the motor 23 and being suitably connected thereto by a conduit 29. The motor 23 controls a water valve 22 in a humidifying device 175 located within or serving the space 10. Upon a decrease in floor line temperature as caused by a decrease in outdoor temperature, the relative humidity of the space adjacent the floor is increased and the humidity responsive device 26 responds to this relative humidity adjacent the floor to cause closing movement of the valve 22 to decrease the amount of moisture being supplied to the space 10 whereby frosting of the windows and condensation on the walls is effectively prevented. The manner in which the humidity responsive device 26 controls the motor 23 of the water valve 22 is exactly the same as that illustrated in Figure 2.

Figure 10:
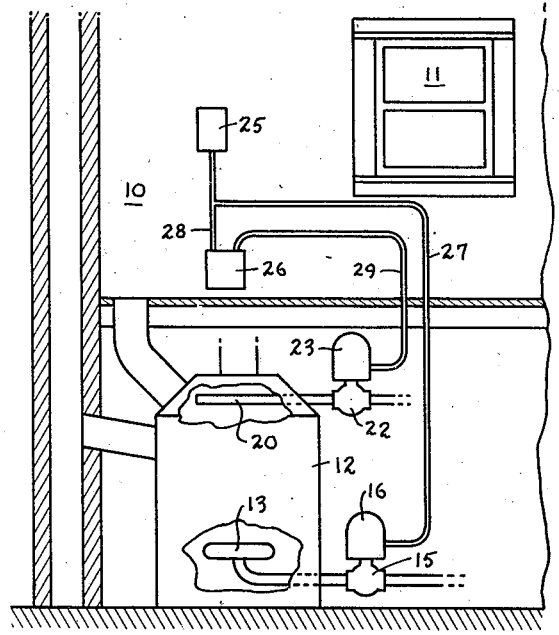

The humidity responsive device 26 which is located adjacent the floor in Figure 8 may also compensate or adjust a room thermostat in exactly the same manner as the humidity device 26 of Figures 1 and 2 compensate or adjust the space thermostat 25 of Figures 1 and 2 and a satisfactory control of the effective temperature of the space may thereby be obtained. This arrangement is shown in Figure 10 wherein the humidity responsive device 26 which adjusts or compensates the thermostat 25 and which controls the valve motor 23 is located adjacent the floor. The conduit connections between the controllers 25 and 26 and the valve motors 16 and 23 are designated by the same reference characters as in Figure 1. The wiring arrangement of Figure 2 may be utilized in Figure 10.

Although I have disclosed for purposes of illustration in this application a modulating or proportioning type of system for accomplishing relative humidity and effective temperature control, this invention is applicable to the off and on type of control system and such off and on manner of operation is contemplated within this invention. Although for purposes of illustration I have disclosed various forms of my invention, other forms thereof may become apparent to those skilled in the art and consequently this invention is to be limited only by the scope of the prior art and appended claims.

I claim as my invention:

1. In a control system for a space, the combination of humidifying means for the space, heating means for the space, means responsive to space temperature for controlling said heating means, and means responsive to the relative humidity in the space which is affected by conditions outside of the space for controlling said humidifying means and additionally controlling said heating means.

2. In a control system for a space having a window, the combination of humidifying means and heating means for the space, means responsive to space temperatures for controlling said heating means, the relative humidity of the space adjacent the window varying in accordance with changes in the condition outside of the space, and means located adjacent the window and responsive to the space relative humidity adjacent the window for controlling said humidifying means and adjusting the temperature responsive means.

GEORGE D. KINGSLAND.